United States Patent [19]

Ullman

[11] Patent Number: 5,411,341
[45] Date of Patent: May 2, 1995

[54] KEYBOARD FOR CHOICE OF SYMBOLS HAVING HAND SUPPORTS

[76] Inventor: Johan M. Ullman, Johannebergsgat. 32B, Göteborg, Sweden, S-412 55

[21] Appl. No.: 206,035

[22] Filed: Mar. 3, 1994

Related U.S. Application Data

[63] Continuation of Ser. No. 838,261, May 19, 1992, abandoned.

[30] Foreign Application Priority Data

Nov. 23, 1989 [SE] Sweden ................. 8903939

[51] Int. Cl.6 ................................. B41J 5/10
[52] U.S. Cl. ........................ 400/489; 400/488; 400/492
[58] Field of Search .............. 400/482, 485, 486, 488, 400/489, 491, 492

[56] References Cited

U.S. PATENT DOCUMENTS

| | | | |
|---|---|---|---|
| 3,319,884 | 5/1967 | Franklin . | |
| 3,805,939 | 4/1974 | Ross . | |
| 3,990,565 | 11/1976 | Felton et al. . | |
| 4,483,634 | 11/1984 | Frey et al. | 400/488 |
| 4,597,681 | 7/1986 | Hodges | 400/492 |
| 4,661,005 | 4/1987 | Lahr . | |
| 4,913,573 | 4/1990 | Retter | 400/482 |
| 5,017,030 | 5/1991 | Crews | 400/485 |
| 5,119,078 | 6/1992 | Grant | 400/486 |
| 5,122,786 | 6/1992 | Rader | 400/489 |
| 5,145,270 | 7/1992 | Darden | 400/488 |

FOREIGN PATENT DOCUMENTS

| | | | |
|---|---|---|---|
| 224600 | 11/1985 | European Pat. Off. . | |
| 0219944 | 4/1987 | European Pat. Off. . | |
| 251643 | 6/1987 | European Pat. Off. . | |
| 552611 | 5/1932 | Germany . | |
| 1810119 | 6/1970 | Germany . | |
| 2218065 | 4/1972 | Germany . | |
| 2607126 | 8/1977 | Germany . | |
| 3318227 | 11/1984 | Germany | 400/489 |
| 2122947 | 1/1984 | United Kingdom | 400/486 |
| 2181096 | 4/1987 | United Kingdom . | |
| WO8706883 | 11/1987 | WIPO . | |
| 8902369 | 3/1989 | WIPO | 400/489 |

Primary Examiner—Edgar S. Burr
Assistant Examiner—John S. Hilten
Attorney, Agent, or Firm—Lerner, David, Littenberg, Krumholz & Mentlik

[57] ABSTRACT

Keyboard for choice of symbols having keys for the highly frequently used symbols divided in two groups, which has a position for placing the fingers except for the thumb for the left hand of the keys to the one group, and for the right hand on the keys of the other group. The groups are arranged at each side of the middle plane for an operator in such a way that the common plane of the key surfaces slope against the horizontal plane by their upwardly turned edges in against each other, and form an angle to the horizontal plane for each of the key planes, preferably about 30° and at an angle to each other by their edges turned away from the operator. The keys in each group are divided in a number of vertically extending rows, having four keys in each row. At the upper side of the key plane, longitudinal supports have been arranged for the thumb of each hand along which support the thumb can slide. The keys and the support for the thumbs are mutually so arranged that at support with the thumb in a displacement position of the hand, a position for said fingers are obtained each opposite one of the four keys in a first row, and a second displacement position opposite the keys in a second row etc.

18 Claims, 4 Drawing Sheets

KEYBOARD FOR CHOICE OF SYMBOLS HAVING HAND SUPPORTS

This is a continuation of application Ser. No. 07/838,261, filed May 19, 1992, now abandoned.

BACKGROUND OF THE INVENTION

The present invention relates to a keyboard for choice of symbols. Such keyboards are characterized in that they have a great number of keys in the order of amount of 50, which are used frequently by the operator and are included in long series and which consequently shall be easily attainable and easily identifiable for bringing about a quick work, preferably without the aid of the eyes. With relation to these characteristics such a keyboard differs from operating keyboards which can have a very small number of keys or other operating numbers or alternatively a very large number which then are served at a low frequency and usually in short series. A middle position is represented by a keyboard on calculating machines at which the keys may be operated frequently and in long series but where they are limited to the ten figures and a few operating keys having less frequent use. This type of keyboard is also used for some other operation for example at telephones. The invention relates accordingly to the first type of keyboard which always is intended to be served by both hands.

The most frequent embodiment of the keyboard in question is the one that exists on typing machines, data terminals and the like. It is sometimes called the QWERTY-keyboard due to the arrangement of the uppermost row of letter keys. The contact surfaces of the keys are substantially in a common plane which is horizontal or slopes somewhat upwardly by its edge which is turned away from the operator. A trained typist has fingers close enough floating above the keyboard and pushes down the different keys by finger movements and small movements of the hands. This means that the hand does not have any accentuated orienting points and the touch of the fingers is more oriented by an inherent feeling of where on the plane the key in question is located than by a feeling of the relation between any stationary reference point and the key in question which is to be pushed down. A trained machine operator therefore performs a work which can be compared with piano playing and which requires a long time education and continuous training.

To reach the most frequently used keys, noting that letters occur with different frequency in the language, with the finger in question and operate them by the most movable fingers firstly the forefinger, the letters are not arranged in alphabetical order but for the most quick writing of a trained operator. This results in that the letters are difficult to find for somebody which is completely untrained. Without a well performed education one will reach a rational way of writing which besides said "floating serving" and complete knowledge of the location of the keys for the different symbols also requires such a great feeling for the exact position of the keys in the plane so that some control of the keyboard with the eyes when writing is not necessary. Only by reaching this stage one can work rationally from the manuscript or in connection with the service of a data terminal where one has a possibility to control the symbols as they are disclosed on the display unit.

The usual type of keyboard, which originally is based on relatively restricted mechanical conditions of the earlier mechanical typewriters, gives certainly a quick way of writing for a trained machine operator but they are slow and difficult to operate for the untrained and also for the one who has a long training but not a proper education. This one will be limited to so called forefinger writing having the whole time visual control of the keys. This has through the rise of the data techniques become a still greater handicap as one now needs to use the eyes for control of what is shown on the screen which is not necessary at a usual typewriter. It is also so that the distribution of the data machines has made still more groups of people using keyboards. Many of the persons who are in this new groups which often have high salaries have practically no typewriter education and will accordingly work irrationally with the traditional keyboard.

A further disadvantage with the modern technique is that one needs to use the eyes to read the keys. At electrical typewriters and data equipment one can often in a simple way by means of the electronics change the different designation of the keys with relation to the symbols; one can for example change between roman letters and greek and other symbols for example formula writings. If every single key is marked with a symbol this will make the writing more difficult. If one on the contrary does not have to read on the keys, the marking of the position of the different symbols can be shown on a scheme on the display unit. If such indirect display, and some type of display is necessary if one has to shift between different keyboards arrangements, an especially good possibility for orientation of the fingers with relation to the keys without the help of the eyes is required.

Also for the one who has a complete education in typewriting the traditional keyboard has some disadvantages. These relate especially to the fact that they require an inconvenient working position for the human physiology having the hands turned to a stressed position both in relation to the horizontal plane and to the sagittal plane (the plane through the symmetry plane of the body through the back bone and extending from the back to the former side of the breast). This stressed position gives, according to what the experience shows in many cases, rise to overstrain of some muscles and muscular attachments having damage as a result.

These disadvantages are known. To make a physiologically more correct handposition possible it has been proposed to divide the keys in two or more groups, which have an angel relative to each other. This has for example been proposed in DE 2 607 126 and U.S. Pat. No. 4,483,634. The U.S. Pat. Nos. 3,990,565 and 4,661,005 do also propose dividing of the usual keyboard on two separate parts on separate elements which can be positioned in different angular positions. Through these solutions one has obtained an ergonomically better solution but said orienting problem for the one who is less trained has not been solved. An example of an attempt to solve said orienting problem is disclosed in DE 1 810 119 in which publication an operating arrangement is shown where all fingers have practically locked positions and where each finger serves only two keys. This type of solution is however not suitable for typewriters where a demand has to be put on the possibility to write quickly as well as a good orientation. The present invention relates besides that as mentioned above, not to the last mentioned type of equipment having a few keys.

The disadvantages and problems described connected with the keyboards for choice of symbols are solved by the present invention where the keys for the most frequently used symbols are divided in two groups having mutually the same number and with contact surfaces for the keys in each group arranged in each of its own reference surface having reference surfaces in a position for placing the fingers except for the thumb for the left hand on one reference surface and for the right hand on the others reference surface. The reference surfaces are arranged at opposite sides of said sagittal plane of an operator in such a way that the reference surfaces slope towards the horizontal plane that is transversely to the sagittal plane having its edges upwardly turned in against each other and forming an angle with the horizontal plane for each plane of 10°–50° preferably about 30° and angularly to each other having their edges turned away from the operator each forming an angle to the sagittal plane of 10°–45° preferably about 30°. The keys in each group are divided in a number of substantial vertically rows having four keys in each row. At the upper side of said reference plane there are longitudinal supports for the thumb area of each hand, along which support the thumb can slide, the keys and the thumb supports being mutually so arranged that by support with the thumb in a displaced position of the hand a position for said fingers is obtained each opposite one of the four keys in the first row and a second displacement position opposite the keys in a second row etc with relation to all keys for the highly frequently used symbols. Herethrough all keys for these symbols will be touchable by placing the hand in a determined displacement position and pushing a key with the finger located opposite the key in this displacement position.

Through the present invention a keyboard has been obtained that, with regard to the functions of the human bodies which gives us a possibility to tactilly recognize objects that quickly gives the one who uses it, a possibility to orient himself to find the keys in question which are to be operated.

Further a keyboard has been obtained which does not bind the movements of the fingers and the hand in such way that a quick writing of for example running text is obstructed.

Still a further advantage is that the keyboard has been constructed taken into regard the human physiology so that unnecessary and unsuitable stress of the body can be avoided resulting in minimizing the risk for a muscle overstraining and damage.

BRIEF DESCRIPTION OF THE DRAWINGS

Two embodiment examples of the invention are shown on the attached drawings where.

DESCRIPTION OF THE PREFERRED EMBODIMENTS

At the embodiment which now shall be described, it is presumed that the keyboard according to the invention is intended for writing of text. The symbols for the letters of the alphabet are then required, for the ten figures, for the punctuation symbols and possibly more specialized symbols and symbols for the operating functions such as for shifting between small and capital letters for reversing etc. If the keyboard shall be used for a computer the number of operating keys can be relatively large to make it possible to carry out the many operations which a computer can perform. These keys and other types of operating means such as slide control shall during writing and in connection therewith be operated at different frequencies. In the present description for the sake of clarity the keys have been divided in different groups according to the frequency of use as shown below:

a) Keys having symbols which are used highly frequently. By this it is meant the usual 24 letters in the alphabet having the keys divided in six groups each including 4 keys. The same keys are used for corresponding symbols in capital shape, but then only by means of shifting.

b) Keys having medium frequently used symbols, some of the least frequently used letters in the alphabet, the figures and the most common punctuations. Here it is supposed that maximum 16 keys which by means of a simple shifting possibility can give at most 32 symbols.

c) Low frequently used symbols of a strange alphabet.

d) Shifting key for shifting between a first choice of symbols for the keys and a second choice; for the letters, a choice between small and capital letters.

e) Other keys which can be regarded as less frequently used than the shifting keys.

f) Adjusting means for example four marginals which usually are used only at the beginning of a writing or for special operations; such means may have different shape and do accordingly not have to be keys.

Figure 1:
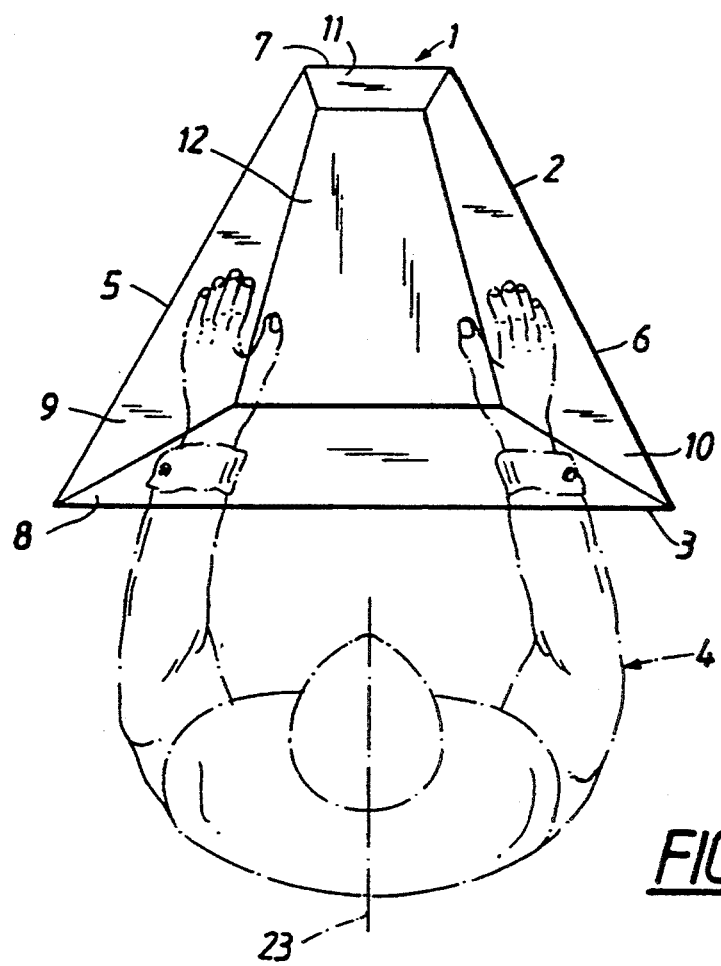
FIG. 1 shows the arrangement according to the invention schematically and in relation to an operator seen from above.
Figure 2:
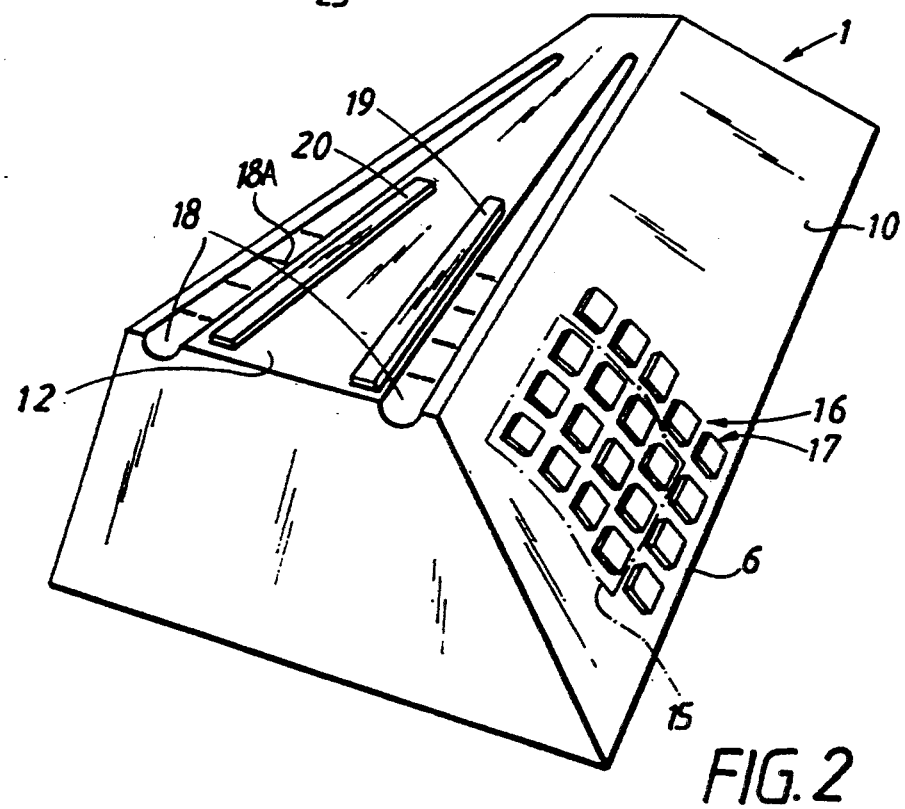
FIG. 2 shows the same arrangement in a perspective view.

It appears from FIG. 2 how these keys for differently frequent use can be arranged. Initially it shall however be described how the keyboard is constructed as to its shape. This appears from FIGS. 1 and 2. The keyboard is thus located on a body 1 which at the embodiment shown in the simplest way can be described as looking like a pyramid and extending from a bottom surface to having the shape of a parallel trapezoid the longer parallel side 3 of which is intended to be turned towards the person that shall use the keyboard which in FIG. 1 is denoted with 4. For the sake of clarity it is assumed that the bottom surface 2 is arranged in a horizontal plane. From the edges of the bottom surface 2, said front edge 3, side edges 5 and 6 and a further edge 7, sides of the body extend upwardly from the bottom surface 2 and slope inwardly toward its centre. Therewith a front side is formed, a left side 9 (seen from the operator), a right side 10 and a further side 11. The upper edges of these sides are connected by means of an upper surface 12.

As appears from FIG. 2 the keys are so divided that half of the highly frequently used symbols (a) are arranged in three rows of keys between upper surface 12 and the bottom surface 2, along the sides 9 and 10 having four keys in each row. Three such rows are arranged at each side. At the right side 10 they are marked by a surrounding line 15. A similar, but mirror turned arrangement as the one at the right side 10 in FIG. 2, is also arranged at the left side 9.

The middle frequently used keys (b) are arranged partly in a corresponding row having four keys and denoted 16 and partly along the edge 6 denoted 17 below the four rows of keys within the area 18. The two undermost rows of keys are suitably as shown displaced in the direction towards the front surface 18 to make it possible for the hand of man. If the fingers are kept in a suitable position somewhat curved then the forefinger, middle finger and the ring finger can make an approximately straight line like the three further most keys in each row while the little finger will be somewhat behind seen from the tips of the fingers. The least stressing position of the function is however obtained at such a curved position of the fingers that the fingertips make a curve having the middle finger for most (see especially FIG. 5). The arrangement of the key rows 16 or 17 is similar at each sides of the body 1, but inverted.

The division of the middle frequently used (b) and the low frequently used (c) symbols on the different keys can be carried out in different ways. It is however suitable to have the most low frequently used symbols selectable after shifting (to a position for capital letters). It shall also be mentioned that if one has too many number of special symbols the keyboard can be made for double shifts, which is known earlier.

At the upper side 12 of the body 1 along the right and left side upper edges at each side standing longitudinal surfaces exists here shown as surfaces in a groove 18, but which alternatively can exist on lists. In the vicinity of the groove at the right side there is a shifting key 19 and along the groove at the left side there is a longitudinal key or more keys arranged in a row suitably in such a case in the same number as the rows of keys at side 9, accordingly 4 as shown in the example.

The principle arrangement of the keys of the keyboard has now been described. The principles laying behind this arrangement are the following:

1. The keys for the highly frequently used symbols (a) shall be so arranged that they are divided into a number substantially vertical but preferably somewhat bowshaped rows having a key for each of the fingers when the hand is located in the position shown in FIG. 1, that is with the thumb located against the upper side 12 of the body 1. From these keys a first row having one key for each finger can accordingly be reached in a first position with the hand close to the body of the operator. Further four keys can be reached with the same fingers by displacing the hand of the operator somewhat forwards. Further, a still more forwardly displaced position exists where the keys can be reached with the four fingers. Totally 2×12 keys can accordingly be reached by moving each of the hands between three different positions and by pushing with one of the four fingers. Through the position of the thumb against the upper side of the keyboard body 1 which suitably is provided with surfaces 18a for example in the grooves 18 to fix the position of the thumb well defined reference positions for the fingers are obtained. The position of the hand more or less forwardly displaced should be well recognized by the swinging of the arm in the shoulder link. One possibility of the invention is also to provide the upper side 12 and especially the grooves 18 with a recognizing relief for the thumb, for example a completely plane groove at the position which the thumb takes when the fingers are opposite the first row of keys, a stripe 18a which start at a corresponding thumb position for the second key row etc.

Through these arrangements one can without difficulties and without having any training or real education orient oneself of exactly where the hand and the fingers are located compared to the twelve highly frequently used keys on each side. There exists accordingly no difficulty to find the proper key with the hand if one knows which symbol each key is intended for. This must consequently be remembered during a learning process, which is supported by direct tactilly easily recognizable hand positions or which finger with which the touch shall be used. To use a table at the beginning which for example is placed on the upper side 12 or possibly on the display unit gives a direct possibility for orientation.

For the middle frequently used (b) and the low frequently used (c) symbols further keys are used. The row 16 will then be reachable by putting the hand a further distance forward and by choosing a finger for the touch. The keys in the row 17 are attainable by stretching out of the little finger. The shifting occurs by means of the thumb which from the groove on the right side 18 is pushed against the shifting key 19. Special operations can be made by the key or the key row 20 by means of the thumb of the left hand.

As for the little finger there is also suitably arranged for the forefinger a second row which can be reached by stretching out the finger.

2. The arrangement of the side surfaces 9 and 10 on the body 1 with relation to the slope in different directions is adapted for obtaining the best ergonomic conditions. Thus the sides slope against each other with relation to the horizontal plane in such a way that the hands can be maintained in an inwardly against each other sloping position which gives the least stressing position. The underarms are swingable with the hands in towards each other however without meeting completely. At said movement of the hands for displacement between rows of the keys the underarms may take a substantially horizontal position and the displacement occurs in the longitudinal direction of the underarms by swinging of the overarms in the shoulderlink without substantial stressing of the elbow joint. The weight of the arms is to a great extent taken up by the thumbs. By adapting the height between the groove 18 and the rows of keys the thumb can be adapted to its position for the best carrying of this load.

What has now been mentioned is of great importance for the function of the keyboard. Said arrangement of the keys gives a simple, tactilly recognizing possibility as to which key respective finger is ready to push down. The shape of the body and the arrangement of the keys in relation to an orienting surface for the thumbs gives a movement possibility between the different rows of keys which gives a minimal physical stress and thereby a possibility for quick operation. At the same time a basic position is obtained which gives a low load on the muscles which besides that is well adapted to the human muscle functions and the least stressing position of the muscles.

Preferably there are some basic characteristics of the invention such that the plane of the keys slope both compared to the horizontal plane (which is defined as the plane from which the body of the operator extends in a substantially perpendicular at upright sitting position) and compared to the sagittal plane (denoted with 23 in FIG. 1). To get said physiologically advantageous sloping hand position having the thumbs sloping in towards each other the said surfaces should have an angle of 10°–50°, preferably about 30° against the horizontal plane. The angle compared to the sagittal plane, or maybe simpler expressed, the angle between the side edges 5, 6 to the bottom surface 2, if this one is presumed to be horizontal, should be 20°–90°, preferably about 60°, that is the angle from the sagittal plane should be half of this value symmetrically to both sides. However, the last mentioned angle is dependent on the width of the body of the keyboard. As mentioned the underarms should be directed with the hands obliquely against each other so that their extensions point to a common point which is in the extension of the sagittal plane. Herethrough the displacement between the rows of keys occurs primarily only through swinging in the shoulder joint. If the body of the keyboard is as wide as the length between the shoulder joints, both sides should be parallel. However, it is impractical to make the body having such a great width by reasons of space and costs. Said angle, preferably about 40° between said edges, is accordingly adapted for a width of the front of 20–25 centimeters. A smaller width should result in that the fingertips almost meet in the most forward position which is not suitable inter alia because the upper side of the body becomes triangular or almost triangular and so small that the arrangement of the thumb supports and the keys described is obstructed. It can also be desirable that further keys can be included.

Thus, the angle of the sides of the body compared to the sagittal plane, that is the angle between the sides of the body in the horizontal plane, must probably be a compromise between different wishes. With regard to the ergonomic conditions, the most convenient position must be such that the sides meet in a point in the sagittal plane which is not more than 40 centimeters ahead of the body of the operator, which gives an angle in the horizontal plane of about 90° and a distance in the front between the lower edges of the side surfaces of about 25 centimeters. Which position is the most convenient for different persons depends however on the shape of the body and may also be individual for some body positions. With regard to the shape of the body of the keyboard from other points of view, it should be desirable not to exceed a width of 25 centimeters at the same time as one at least in certain cases wishes the upper surface to be so large as possible. This results in that the angle is diminished so that the bottom surface shown corresponding to a parallel trapezoid is obtained and with the extensions of the underarms meeting each other at a greater distance from the body. Also, such an arrangement gives an advantageous working position. The optimal shape can accordingly not be decided until all said factors have been determined.

Figure 3:
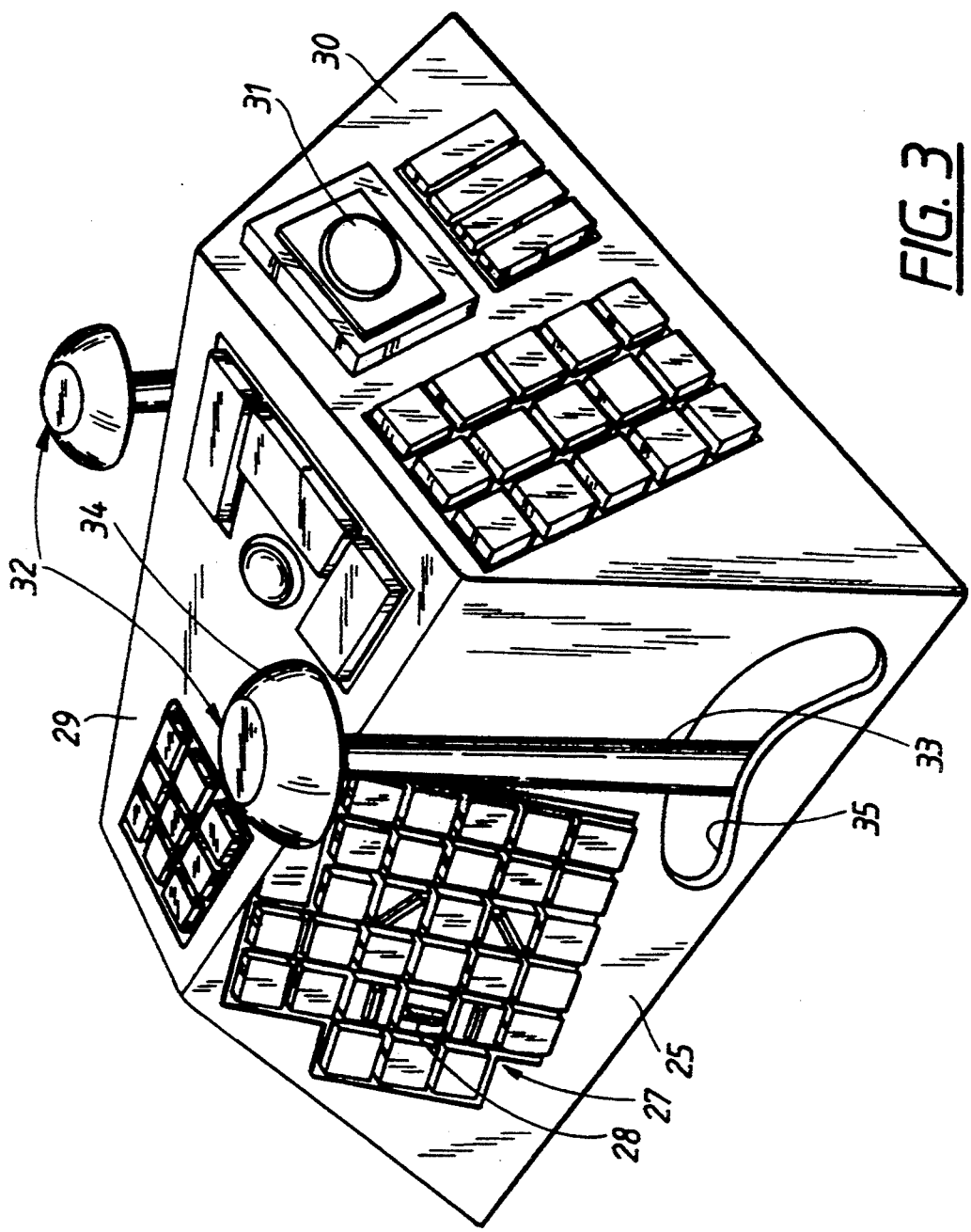
FIG. 3 shows the arrangement in a more complete first shape of the product for which the invention is a base, the picture being a perspective view.
Figure 4:
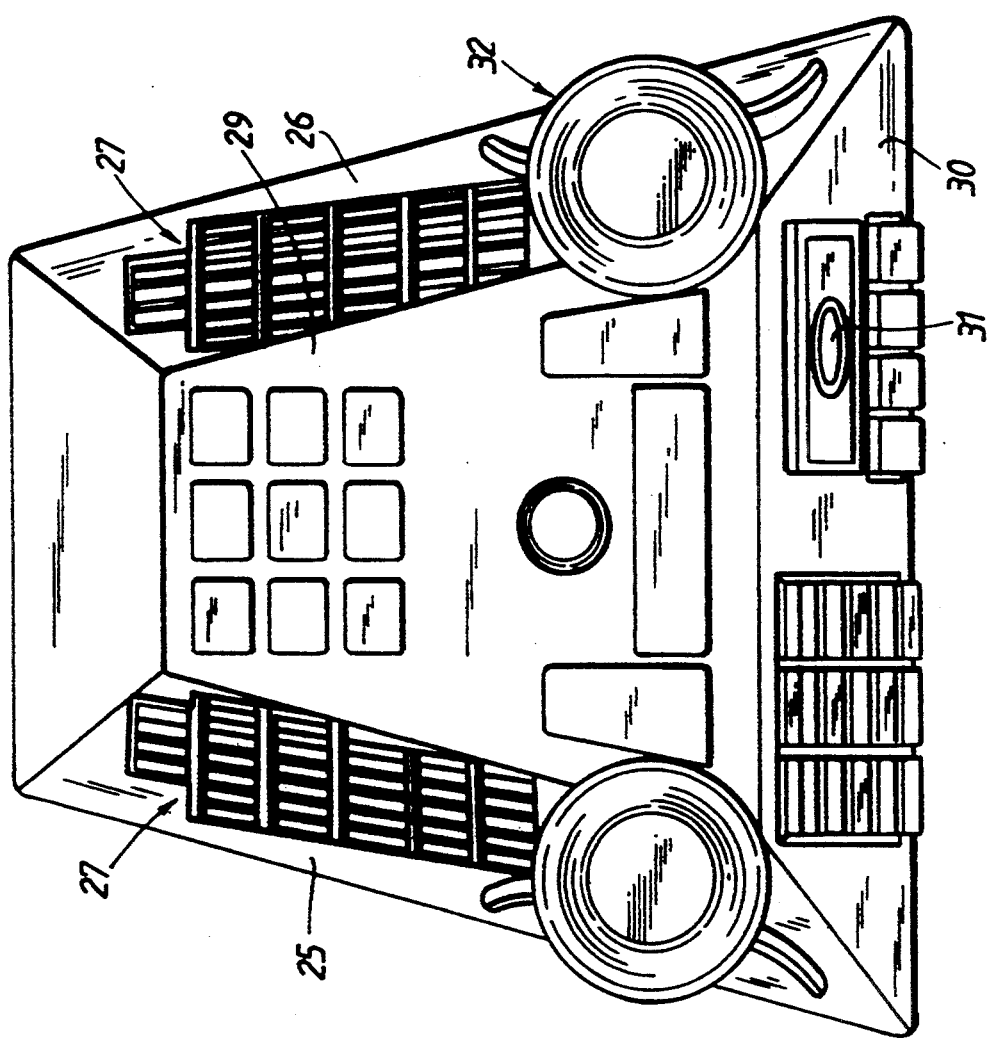
FIG. 4 shows the embodiment shown in FIG. 2 in a view from above.

In FIG. 3 and 4 a further and more complete shape of the keyboard and its carrying body is shown. Also here two key carrying side surfaces can be found, of which only the left one is shown in FIG. 3 and having been denoted with 25. The right one has been denoted with 26 in FIG. 4. Said keys for the high, middle and certain of the low frequently used symbols can be found at said sides and are denoted as a group with 27. They are more than what has been stated earlier, and intended to comprise further low frequently used symbols. It is also indicated that some keys at such a comprising keyboard can be provided with listshaped protrusions 28 for easier recognition when so many keys exists, that the earlier described simple recognition method based on a key for each finger in each hand position is no more applicable. A further difference is that the upper side here denoted 29 comprises more keys. It has not been provided with any grooves for the thumbs but these are intended to follow the edge of the upper surface. Also the front side here 30, has keys for operation or for special symbols. With 31 is a operating member for movement of markings on a display unit denoted. It can for example have the shape of a ball which is movable in different directions (replaces a so called mouse) or a Joystick. It can be operated easily by means of the thumb on the right hand.

Further two hand supports 32 are shown. They are shown here having the shape of two swingable arms 33 having a mushroom shaped resting cushion for the hand. By swinging the arms 33 they can move in slots 35 in the sides 25 and 26. The purpose is that each hand shall be placed with the thenar area (the cushion shaped part of the hand inside the thumb) against the resting cushion 32. Herethrough, the hand is carried in the most favourable way. Said forward and return movement of the hand to reach the different rows of keys occurs afterwards by moving respective arm 33 completely carrying the weight of the hand. This arrangement is most suitable at keyboards which are used for writing of long running texts, but it can also provide an obstacle at keyboards which are used temporarily for shorter operations as in question terminals. It can therefore be suitable to have the hand support 32 insertable or foldable. Further installation possibilities can be introduced for keyboards for example changeability of its sides for individual adaption of the angles. This can be particularly interesting and the arrangements can be adapted to be used by persons having movement handicaps.

Said supports having resting bodies arranged on the swing arms is only one embodiment example. Alternatively forward and backwards movement can be obtained by linear displacement of bodies on which the resting cushions are arranged. Herethrough, some kind of guiding arrangement is required for these bodies. One further alternative embodiment is to make the bodies stationary, but in the shape of turnable rotation bodies such as barrelformed rolls or balls. The later can then be arranged in bowles for movement in all directions. If the resting surface is made sufficiently smooth, it can exist on a completely rigid body so that a relative movement must occur between the hand and the surface.

At surfaces on bodies having some possibility for movement, for example at the embodiment shown in the drawings, a movement mechanism for the body having the surface, can for the position orientation of the hand be made including some power system. Thus, the arm can be spring loaded to take a predetermined position so that the operator with the arm feels if the arm is moved forward or backward or through increasing resistance also to what extent. Alternatively the movement of the body can be selectively positionable so that one with the feeling can determine when certain positions are taken or past.

With such power arrangements the orientation possibility for the hand, that is the position of the fingertips in front of one or an other row of keys, can be determined. Earlier it has been mentioned that such a recognition possibility for the position of the hand can be made by means of supporting pads for the thumbs by the embodiment in the grooves 18. Then it has been mentioned that the surfaces can be provided with a recognition relief. This possibility can be replaced by, or completed with said power arrangement together with the resting surfaces for the thenar area of the hand, which is carried by the arms, the slides or some other arrangements chosen.

Figure 5:
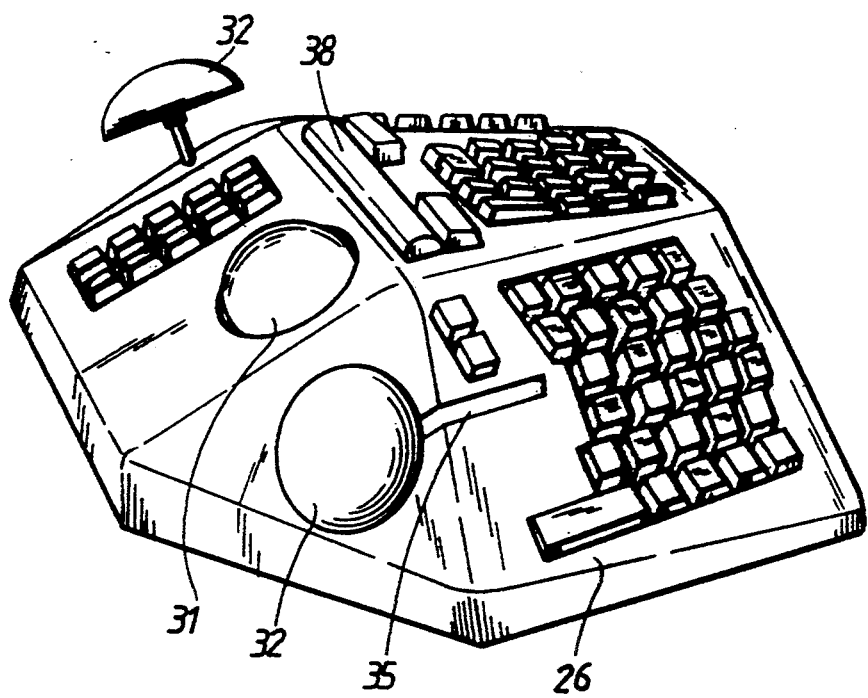
FIG. 5 shows a second embodiment in a side perspective view.
Figure 6:
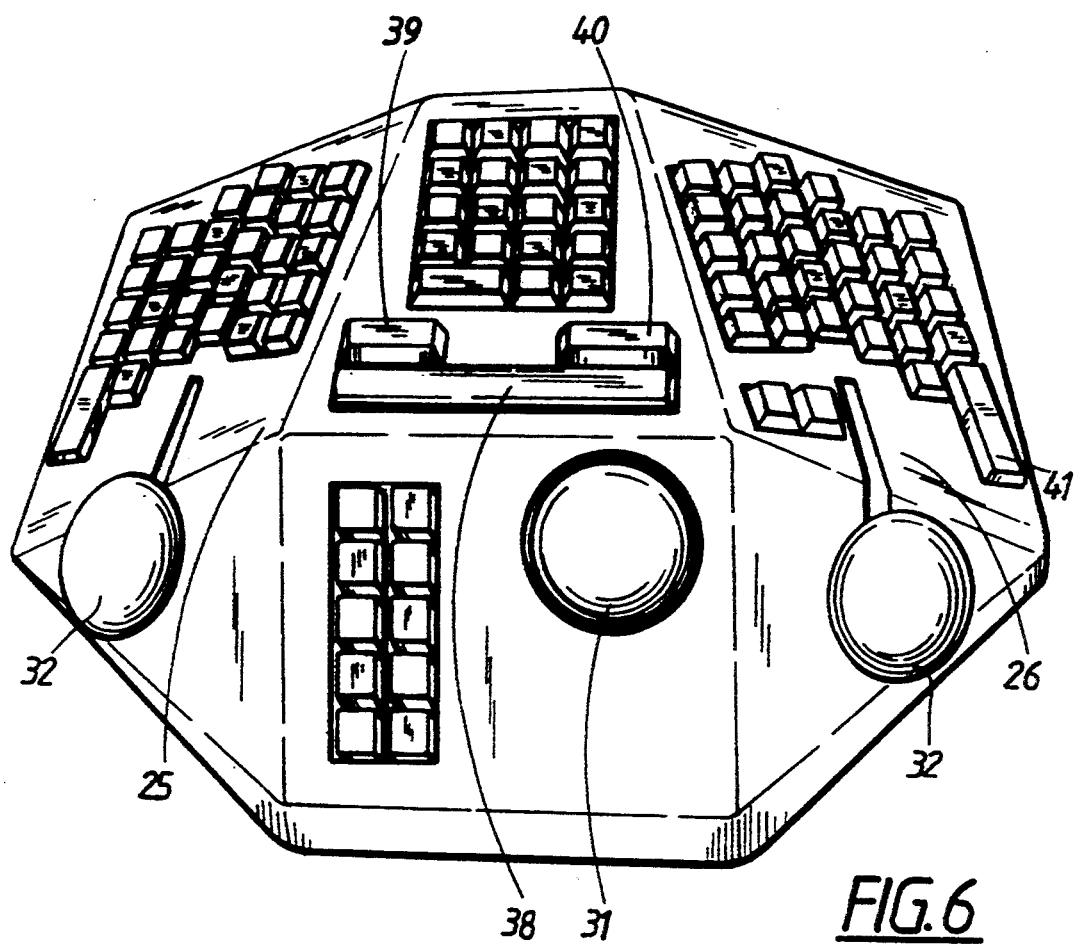
FIG. 6 shows the same embodiment in a perspective view seen from the front side.

In FIGS. 5 and 6, showing perspective views of the second embodiment of the keyboard, substantially the same parts as shown in FIGS. 3 and 4 having the same denotations can be found. However, it also appears that a space bar key 38 has been arranged transversely on the arrangement between the two side faces 25 and 26. In front of the space bar key two keys for movement of the carriage, a backspace key 39 and a return key 40 are arranged. At the bottom of the side surfaces 25 and 26 there is a space bar key 41 which accordingly can be reached by the little finger. As also appears from the figures the front surface is not completely plain, but has a protruding part which via oblique corner parts continues in the side surfaces 25 and 26.

The resulting technical effect from an arrangement of this kind, that is its usability in view of the goals by the solution is obtained by several cooperating factors. One has then not only decided upon a few main factors, according to which the arrangement shall be constructed. All factors must be directed to reach the goal which is aimed at. In the present case this goal, that is to get a good orienting ability only through the feeling for quick learning also by untrained operators at the same time as a good ergonomical working procedure shall be obtained. To obtain an optimal result in this regard taking into account all factors some characteristics could best be expressed as intentions rather than direct specifications of for example the dimensions and of shape factors. How different writing or operating functions are obtained technically by manual influence by a key or some other member has not been mentioned. It should, however, immediately be understood that the keyboard can be shaped for operation of many types of typewriter equipment. Typically it can be presumed that keyboards of this kind will be used for electrically operated equipment such that electrical typewriters or computers. According to what is known earlier, the keys for operating are made as some kind of current switch or at optical techniques as ray switches or ray links. Impulses from the keyboard are then conducted to the equipment that is to be operated. All this is however well known for the man skilled in the art and the special position arrangement of the keys at the keyboard according to the invention should then not provide any particular difficulties.

I claim:

1. A keyboard comprising:
a body comprising at least two side surfaces symmetrically disposed on opposite sides of a center plane perpendicular to a horizontal plane when said keyboard is placed in its intended position in front of an operator, said at least two side surfaces being disposed along side surface planes;
a plurality of keys disposed on said body; and
at least one hand displacement surface means connecting said hand displacement surface to said body, said hand displacement surface allowing for movement of a hand of a operator relative to said body in a substantially straight line along a hand displacement plane, said hand displacement surface having means for supporting a hand of an operator in a plurality of supported positions above said body and said at least two side surfaces said hand displacement plane being substantially coextensive with said side surface planes for manipulation of said plurality of keys by an operator as a hand is moved along said hand displacement planes.

2. The keyboard as claimed in claim 1, wherein said means for supporting comprises a pair of longitudinal thumb support guides positioned on said body to carry and guide the thumbs of the operator's hands along said at least two side surfaces.

3. The keyboard as claimed in claim 2, wherein said thumb support guides are provided with reference surfaces for tactile recognition indicating different displacement positions of the hands of the operator with respect to said keyboard.

4. The keyboard as claimed in claim 2, wherein said thumb support guides comprise a pair of elongate thumb receiving grooves.

5. The keyboard as claimed in claim 4, wherein said grooves are provided with reference surfaces for tactile recognition to indicate different displacement positions of the hands of the operator with respect to said keyboard.

6. The keyboard as claimed in claim 1, wherein said means for supporting comprises two upwardly directed resting surfaces for supporting the operator's hands substantially at the thenar areas.

7. The keyboard as claimed in claim 6, wherein each of said resting surfaces is attached to said body by an elongate support arm having an upper end and a lower end, said resting surfaces being disposed on said upper end and said lower end being swingably hinged to said body to allow for movement of said support arms along said hand displacement planes.

8. The keyboard as claimed in claim 7, wherein said support arms are insertable into said body of said keyboard.

9. The keyboard as claimed in claim 8, wherein said resting surfaces have a hemispherical shape.

10. The keyboard as claimed in claim 1, wherein said side surface planes are arranged so as to slope upwardly inwards towards one another and toward said center plane.

11. The keyboard as claimed in claim 10, wherein said means for supporting comprises a pair of longitudinal thumb support guides positioned on said body to carry and guide the thumbs of the operator's hands along said at least two side surfaces.

12. The keyboard as claimed in claim 11, wherein said thumb support guides are provided with reference surfaces for tactile recognition indicating different displacement positions of the hands of the operator with respect to said keyboard.

13. The keyboard as claimed in claim 11, wherein said thumb support guides comprise a pair of elongate thumb receiving grooves.

14. The keyboard as claimed in claim 13, wherein said grooves are provided with reference surfaces for tactile recognition to indicate different displacement positions of the hands of the operator with respect to said keyboard.

15. The keyboard as claimed in claim 10, wherein said means for supporting comprises two upwardly directing resting surfaces for supporting the operator'hands substantially at the thenar areas.

16. The keyboard as claimed in claim 15, wherein each of said resting surfaces is attached to said body by an elongate support arm having an upper end and a lower end, said resting surfaces being disposed on said upper end and said lower end being swingably hinged to said body to allow for movement of said support arms along said hand displacement planes.

17. The keyboard as claimed in claim 16, wherein said support arms are insertable into said body of said keyboard.

18. The keyboard as claimed in claim 17, wherein said resting surfaces have a hemispherical shape.

* * * * *

UNITED STATES PATENT AND TRADEMARK OFFICE
CERTIFICATE OF CORRECTION

PATENT NO. : 5,411,341
DATED : May 2, 1995
INVENTOR(S) : Ullman

It is certified that error appears in the above-indentified patent and that said Letters Patent is hereby corrected as shown below:

On the title page, item [63], Related U.S. Application Data, should read --Continuation of Serial No. 838,261, May 19, 1992, abandoned filed as PCT/SE90/00759, filed November 22, 1990--

Column 3, line 33, "etc" should read --etc.--.

Column 5, line 30, delete "number of".

Column 10, line 1, after "surface" insert --,--.

Column 11, line 5, "operator'hands" should read --operator's hands--.

Signed and Sealed this

Seventeenth Day of October, 1995

Attest:

BRUCE LEHMAN

Attesting Officer

Commissioner of Patents and Trademarks